US012062866B2

(12) United States Patent
Shimoju

(10) Patent No.: US 12,062,866 B2
(45) Date of Patent: Aug. 13, 2024

(54) ELECTRICAL CONNECTOR HAVING A MOVABLE CONTACT PORTION AND A MOVABLE PROTECTOR

(71) Applicant: ACES ELECTRONICS CO., LTD., Zhongli (TW)

(72) Inventor: Toshiharu Shimoju, Tokyo (JP)

(73) Assignee: ACES ELECTRONICS CO., LTD., Zhongli (TW)

( * ) Notice: Subject to any disclaimer, the term of this patent is extended or adjusted under 35 U.S.C. 154(b) by 366 days.

(21) Appl. No.: 17/648,339

(22) Filed: Jan. 19, 2022

(65) Prior Publication Data

US 2022/0247112 A1 Aug. 4, 2022

(30) Foreign Application Priority Data

Feb. 1, 2021 (JP) ................................ 2021-014307

(51) Int. Cl.

*H01R 13/24* (2006.01)
*H01R 12/71* (2011.01)
*H01R 13/453* (2006.01)

(52) U.S. Cl.

CPC ......... *H01R 13/453* (2013.01); *H01R 12/714* (2013.01); *H01R 13/2428* (2013.01)

(58) Field of Classification Search

CPC ............... H01R 12/714–13/248; H01R 13/453
See application file for complete search history.

(56) References Cited

U.S. PATENT DOCUMENTS 7,029,328 B1 * 4/2006 Mckenzie .......... H01R 13/5221 439/587
9,461,391 B2 * 10/2016 Kato .................... H01R 13/453
2015/0311619 A1 10/2015 Kato

FOREIGN PATENT DOCUMENTS

WO 2014084293 A1 6/2014

* cited by examiner

*Primary Examiner* — Vanessa Girardi
(74) *Attorney, Agent, or Firm* — Chiesa Shahinian & Giantomasi PC

(57) ABSTRACT

A connector includes: a contact including a contact portion connected to a connection terminal by pushing the connection terminal of an external device; a protector protecting the contact portion by covering the contact and including a first opening portion making the contact portion protrude; and a base body accommodating the contact and the protector, and including a second opening portion making the protector protrude; a first waterproof elastic member provided between the contact and the first opening portion and preventing liquid from intruding from a space between the contact and the first opening portion; a second waterproof elastic member provided between the protector and the second opening portion and preventing liquid from intruding from a space between the protector and the second opening portion. The contact portion is movable with respect to the first opening portion. The protector is movable with respect to the second opening portion.

16 Claims, 12 Drawing Sheets

ELECTRICAL CONNECTOR HAVING A MOVABLE CONTACT PORTION AND A MOVABLE PROTECTOR

CROSS-REFERENCE RELATED APPLICATIONS

The present application claims priority from Japanese Patent Application No. 2021-014307, filed on Feb. 1, 2021, the disclosure of which is incorporated herein by reference in its entirety.

TECHNICAL FIELD

The present invention relates to a connector connected to a connection terminal of an external device.

BACKGROUND

A connector, which includes a contact having a contact point electrically connected to an external device by pushing a connection terminal of the external device, a protector protecting the contact point by covering a periphery of the contact, and a base body storing the contact and the protector, is known (for example, refer to Patent Literature 1). In this connector, the protector has an opening portion making the contact point protrude in a predetermined direction, and the base body has an opening portion making the protector protrude in a predetermined direction. The connection terminal of the external device is pushed in a direction opposite to the predetermined direction so that the contact point moves in the direction opposite to the predetermined direction with respect to the protector and the protector moves in a direction opposite to the predetermined direction with respect to the base body.

CITATION LIST

Patent Literature

Patent Literature 1: WO 2014/084293 A

SUMMARY

Technical Problem

In the connector described above, since the contact point protrudes from the opening portion of the protector and is movable with respect to the protector, there is a gap between the contact point and the opening portion of the protector, and there is a possibility that liquid such as water intrudes from the outside. Similarly, in the connector described above, since the protector protrudes from the opening portion of the base body and is configured to be movable with respect to the base body, there is a gap between the protector and the opening portion of the base body, and there is a possibility that the liquid such as water intrudes from the outside.

An object of the present invention is to provide a connector preventing the liquid from intruding from the outside.

Solution to Problem

A connector of the present invention includes: a contact that includes a contact portion electrically connected to a connection terminal by pushing the connection terminal of an external device in a predetermined direction; a protector that protects the contact portion by covering the contact and includes a first opening portion making the contact portion protrude in a direction opposite to the predetermined direction; and a base body that accommodates the contact and the protector, and includes a second opening portion making the protector protrude in the direction opposite to the predetermined direction, in which the contact portion is movable in the predetermined direction and in the direction opposite to the predetermined direction with respect to the first opening portion, the protector is movable in the predetermined direction and in the direction opposite to the predetermined direction with respect to the second opening portion, and the connector includes a first waterproof elastic member that is provided between the contact and the first opening portion and prevents liquid from intruding from a space between the contact and the first opening portion, and a second waterproof elastic member that is provided between the protector and the second opening portion, and prevents liquid from intruding from a space between the protector and the second opening portion.

The connector of the present invention further includes a resin member that covers the contact in a vicinity of the contact portion. The first waterproof elastic member is interposed between the resin member and the first opening portion.

In the connector of the present invention, the first waterproof elastic member includes a first pushing portion that pushes a portion around the contact in the vicinity of the contact portion in a direction intersecting the predetermined direction.

In the connector of the present invention, the second waterproof elastic member includes a second pushing portion that pushes a portion around the protector located in a vicinity of the second opening portion in the direction intersecting the predetermined direction.

In the connector of the present invention, a cross-sectional shape of the second waterproof elastic member is an X shape.

The connector of the present invention further includes a third waterproof elastic member that includes a wall covering a portion around the contact portion and extending in the direction opposite to the predetermined direction, and prevents the liquid from intruding into the portion around the contact portion when the contact portion of the contact is electrically connected to the connection terminal of the external device.

In the connector of the present invention, the third waterproof elastic member includes a third pushing portion that pushes a surface, on which the connection terminal of the external device is exposed, in the direction opposite to the predetermined direction.

The connector of the present invention further includes an elastic member that pushes the protector in the direction opposite to the predetermined direction when the external device is fitted to the connector.

In the connector of the present invention, the first waterproof elastic member and the third waterproof elastic member are formed of one member.

The connector of the present invention further includes a plurality of the contacts. The third waterproof elastic member includes a waterproof wall extending in the direction opposite to the predetermined direction between the contact portion and the contact portion.

In the connector of the present invention, at least one of the first waterproof elastic member or the second waterproof elastic member is formed of silicone rubber.

Advantageous Effects of Invention

According to the present invention, a connector capable of preventing the liquid from intruding from the outside can be provided.

DETAILED DESCRIPTION

Figure 1:
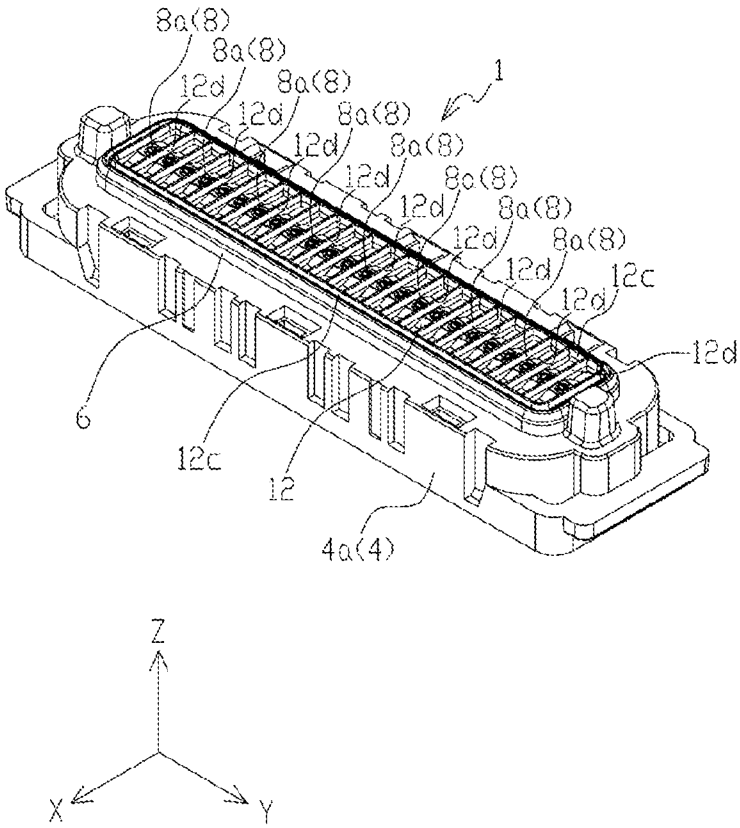
FIG. 1 is a perspective view illustrating an appearance of a connector according to an embodiment.
Figure 2:
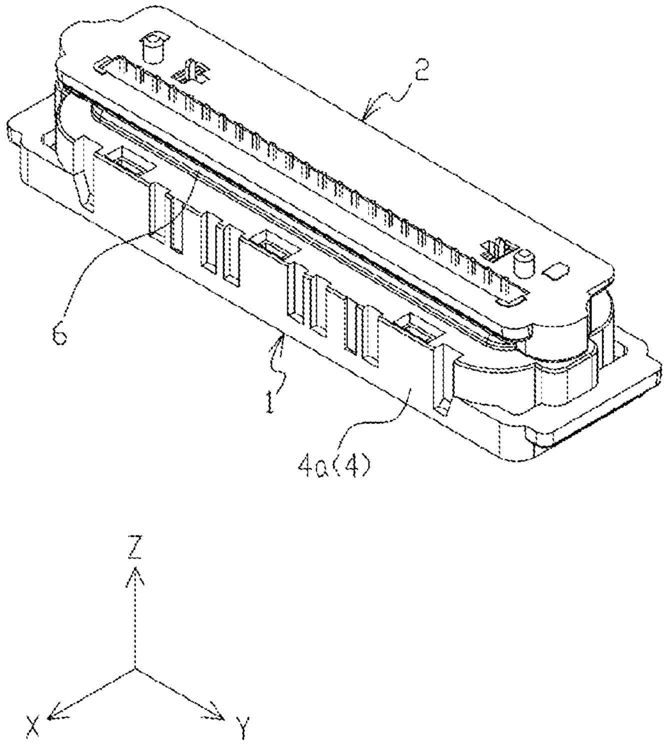
FIG. 2 is a perspective view illustrating a state of fitting the connector to an external device according to the embodiment.
Figure 3:
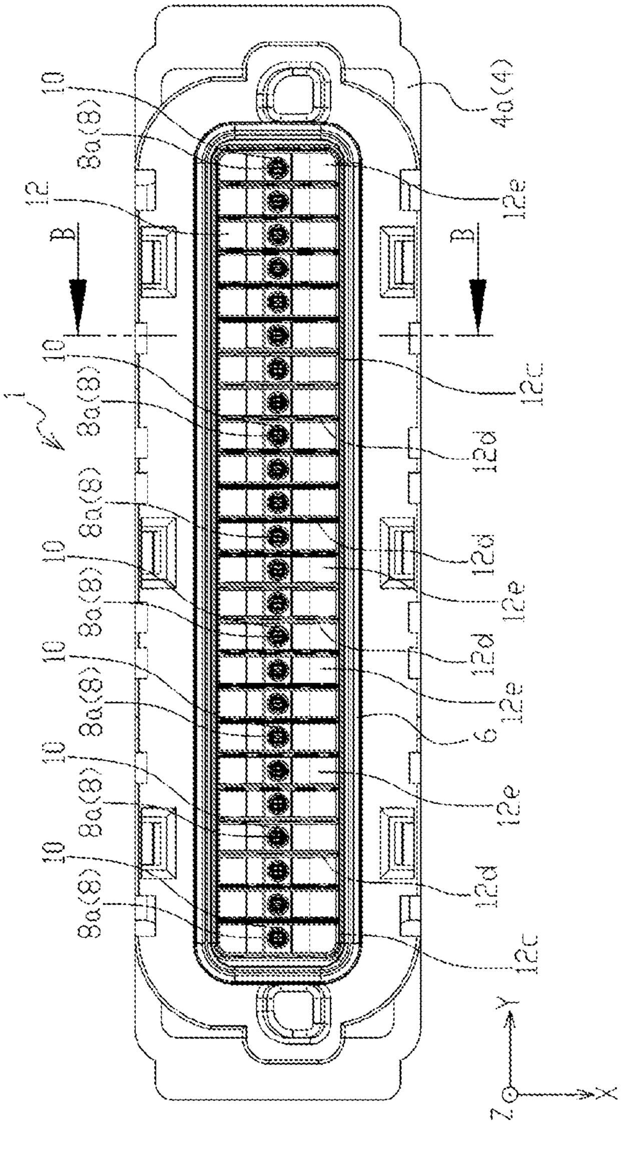
FIG. 3 is a plan view illustrating the appearance of the connector according to the embodiment.
Figure 4:
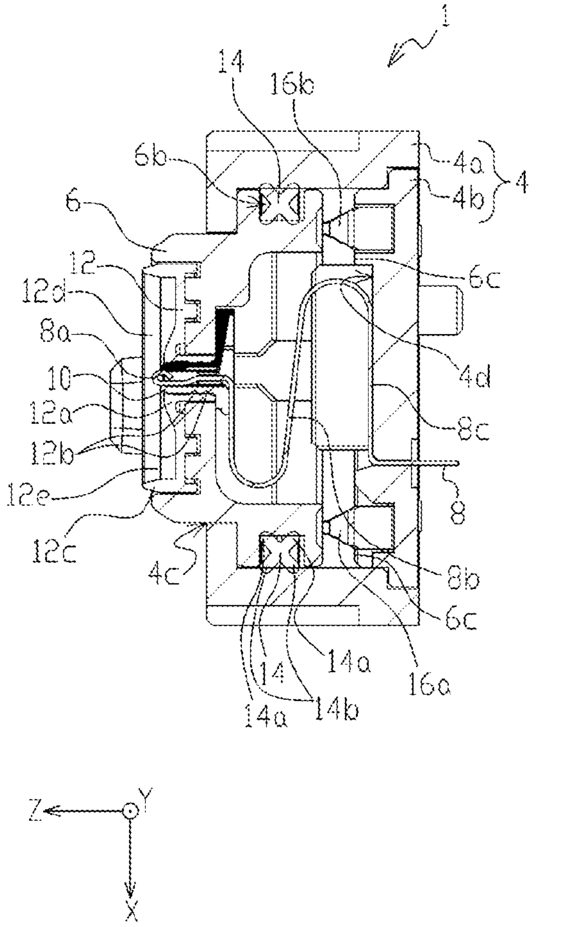
FIG. 4 is a cross-sectional view illustrating the connector according to the embodiment.
Figure 5:
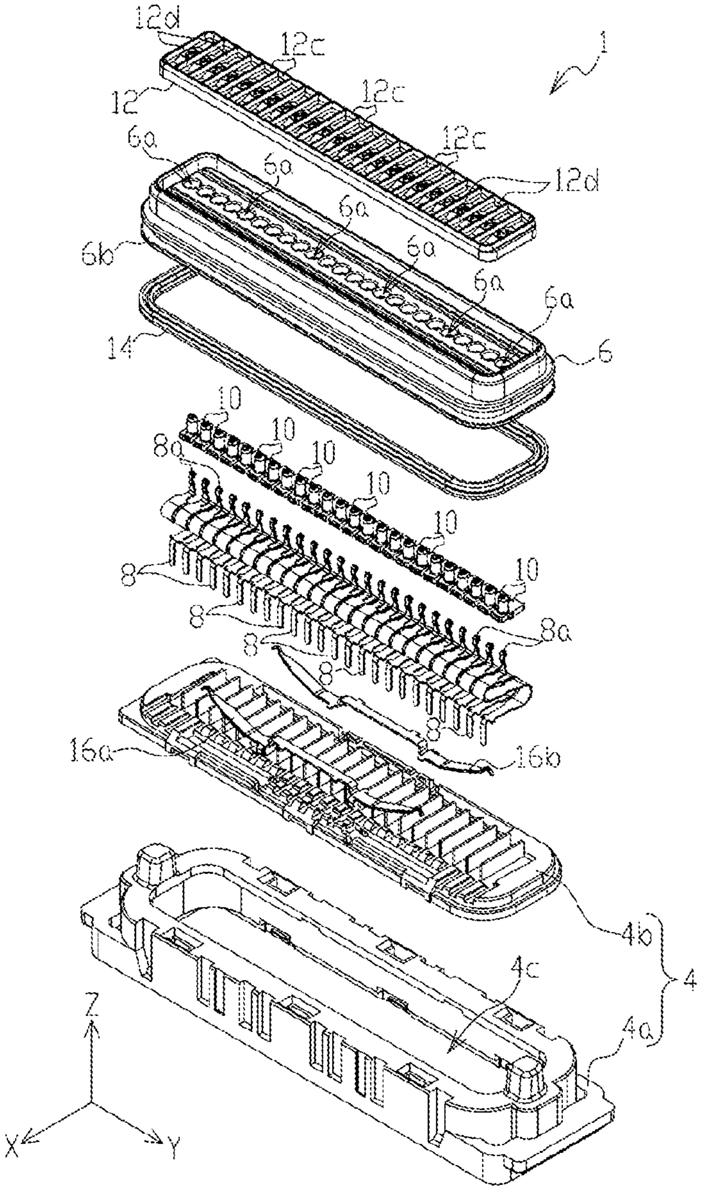
FIG. 5 is an exploded view illustrating the connector according to the embodiment.
Figure 6:
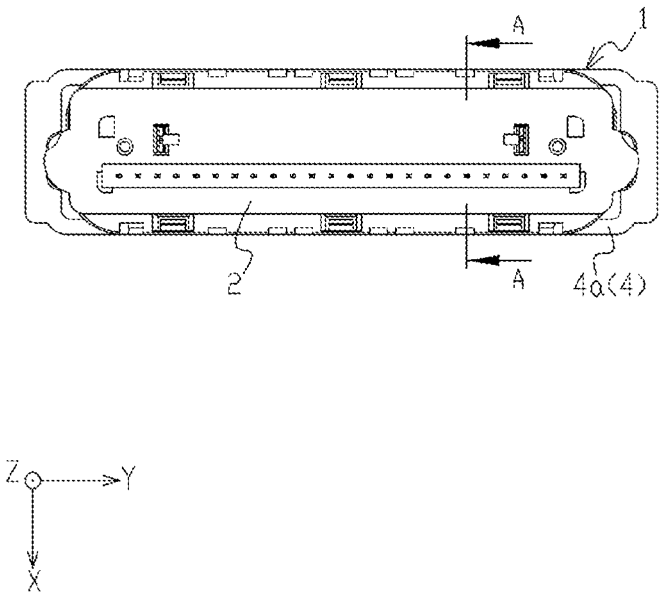
FIG. 6 is a plan view illustrating the state of fitting the connector and the external device according to the embodiment.
Figure 7:
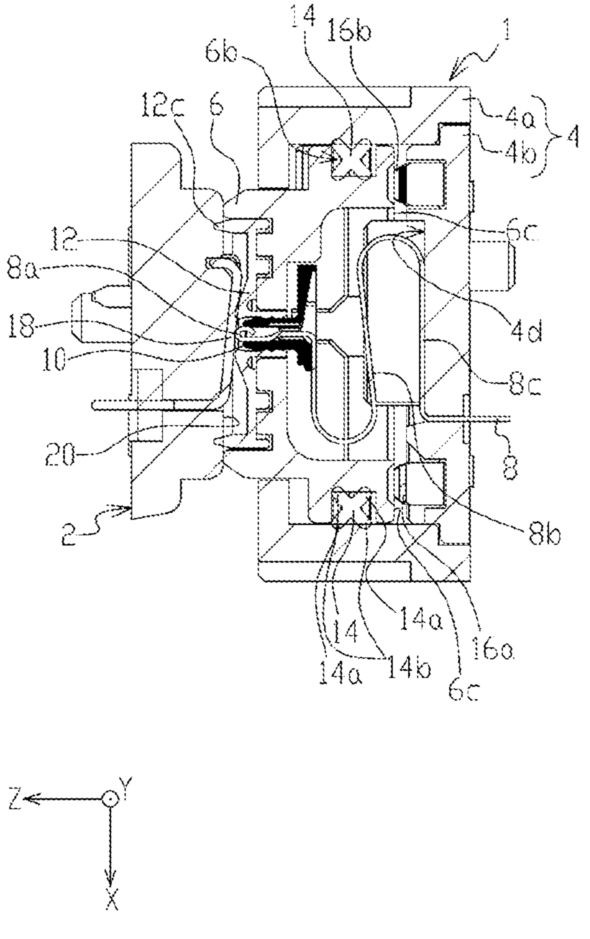
FIG. 7 is a cross-sectional view illustrating the state of fitting the connector and the external device according to the embodiment.

Hereinafter, with reference to the drawings, as a connector according to an embodiment, a push-type connector that is electrically connected to a connection terminal of an external device by pushing the connection terminal of the external device such as a mobile information terminal will be described. FIG. 1 is a perspective view illustrating an appearance of the connector according to the embodiment, FIG. 2 is a perspective view illustrating a state of fitting the connector to the external device, FIG. 3 is a plan view illustrating the connector, FIG. 4 is a cross-sectional view illustrating the connector (B-B sectional view of FIG. 3), and FIG. 5 is an exploded view illustrating the connector. FIG. 6 is a plan view illustrating the state of fitting the connector to the external device, and FIG. 7 is a cross-sectional view illustrating the state of fitting the connector to the external device (A-A sectional view in FIG. 6). As illustrated in FIG. 1, a connector 1 according to this embodiment includes a base body 4, a protector 6, and a plurality of (24 in this embodiment) contacts 8. In the following description, an XYZ orthogonal coordinate system illustrated in FIGS. 1 to 7 will be set, and a positional relationship of each member will be described with reference to the orthogonal coordinate system. A Y-axis is set to be parallel to a direction in which the 24 contacts 8 are arranged. A Z-axis is set to be parallel to a direction in which an external device 2 is pushed against the connector 1. An X-axis is set in a direction orthogonal to a YZ plane.

As illustrated in FIGS. 4 and 5, the base body 4 is formed of two insulating members 4*a* and 4*b* such as a resin, and accommodates the protector 6 and the 24 contacts 8. The insulating member 4*a* of the base body 4 is provided with a second opening portion 4*c* penetrating in a Z direction. The insulating member 4*b* is disposed on a −Z direction side of the second opening portion 4*c*, and the protector 6 is disposed on a +Z direction side of the second opening portion 4*c*. The second opening portion 4*c* makes the protector 6 protrude in the +Z direction.

The protector 6 is formed by an insulator such as a resin, and protects contact portions 8*a* of the 24 contacts 8 by covering the 24 contacts 8 from the +Z direction side. As illustrated in FIG. 5, 24 first opening portions 6*a* having a circular shape disposed in a row in a Y direction are formed on a surface of the protector 6 on the +Z direction side. Each of the contact portions 8*a* and each of resin members 10 to described later are disposed in each of the first opening portions 6*a*, and the first opening portions 6*a* make the contact portions 8*a* protrude in the +Z direction. The protector 6 is movable in a ±Z direction with respect to the second opening portion 4*c* of the base body 4.

As illustrated in FIGS. 4 and 5, the protector 6 is provided with a recess portion 6*b* that goes around an outer circumferential surface, and a ring-shaped waterproof silicone rubber 14 is fitted to the recess portion 6*b*. The waterproof silicone rubber 14 is provided between the protector 6 and the second opening portion 4*c*, and functions as a second waterproof elastic member that prevents liquid from intruding from a portion between the protector 6 and the second opening portion 4*c*. The cross-sectional shape of the waterproof silicone rubber 14 is an X shape as illustrated in FIG. 4, and the waterproof silicone rubber 14 has two second pushing portions 14*a* that push a portion around the protector 6 located in the vicinity of the second opening portion 4*c*, that is, the recess portion 6*b* toward a center portion of the protector 6 in a direction orthogonal to the Z-axis direction. The waterproof silicone rubber 14 has two pushing portions 14*b* that push the base body 4 (insulating member 4*a*) radially in the direction orthogonal to the Z-axis direction.

Each of the second pushing portions 14*a* is a protruding portion that protrudes from the waterproof silicone rubber 14 toward the center portion of the protector 6, and pushes the recess portion 6*b* of the protector 6. Each of the pushing portions 14*b* is a protruding portion that protrudes from the waterproof silicone rubber 14 in a direction protruding radially from the center portion of the base body 4, and pushes the insulating member 4*a* of the base body 4. Since the second pushing portions 14*a* push the outer circumferential wall of the protector 6 without a gap and the pushing portions 14*b* push the inner circumferential wall of the base body 4 without a gap, liquid is prevented from intruding into a space between the protector 6 and the second opening portion 4*c* (inside the base body 4). While the protector 6 is moving in the ±Z direction with respect to the second opening portion 4*c*, the liquid is prevented from intruding into the space between the protector 6 and the second opening portion 4*c* (inside the base body 4) since the second pushing portions 14*a* continue to push the outer circumferential wall of the protector 6 and the pushing portions 14*b* continue to push the inner circumferential wall of the base body 4. In this embodiment, the case where the two second pushing portions 14*a* and the two pushing portions 14*b* are provided has been described as an example, but one or three or more second pushing portions and one or three or more pushing portions may be provided.

Figure 8:
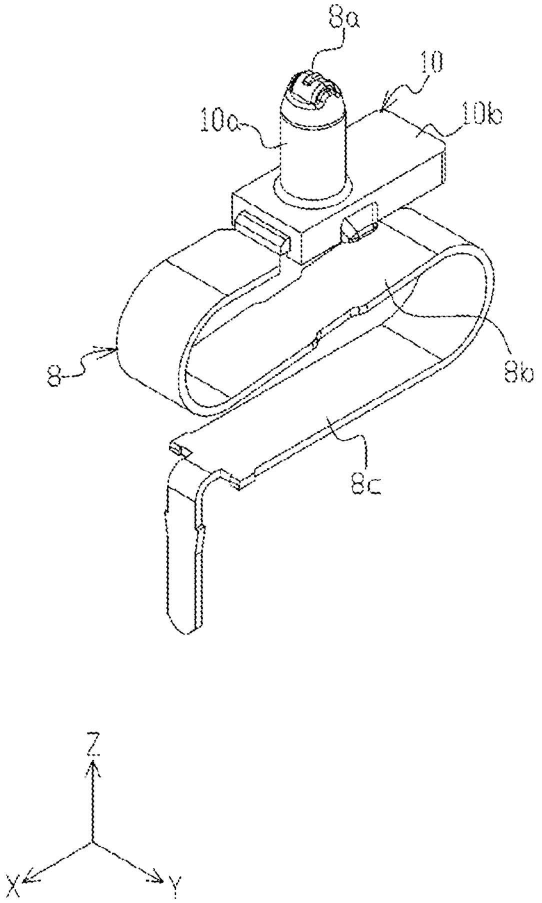
FIG. 8 is a view illustrating a contact according to the embodiment.

The 24 contacts 8 are formed of a conductive member such as metal, and are arranged in a row in the Y direction as illustrated in FIG. 1. FIG. 8 is a view illustrating a configuration of one contact 8 and one resin member 10. The configurations of the 24 contacts 8 and the 24 resin members 10 are the same. Each of the contacts 8 has the contact portion 8*a* electrically connected to each of connection terminals 18 by pushing the connection terminals 18 of the external device 2 in the −Z direction. Each of the contact portions 8*a* is individually movable in the ±Z direction with respect to the first opening portion 6*a*. Each of the contacts 8 has an elastic portion 8*b* that pushes up the protector 6 and the contact portion 8*a* in the +Z direction, and a held portion 8*c* that is held by a holding surface 4*d* which is a surface parallel to an XY plane. The holding surface 4*d* is formed on the insulating member 4*b* of the base body 4. In this embodiment, the case where a plurality of the contacts 8 are provided has been described as an example, but one contact may be provided.

The connector 1 includes 24 resin members 10. Each of the resin members 10 has a covering portion 10*a* for covering the contact 8 in the vicinity of the contact portion 8*a*, and a push-up surface 10*b* for pushing up the protector 6 in the +Z direction. In the covering portion 10*a*, the contact 8 on the −Z direction side of the contact portion 8*a* (between the contact portion 8*a* and the elastic portion 8*b*) is insert-molded. The resin member 10 is provided for being interposed between the contact 8 and a waterproof silicone rubber 12 to be described later, and prevents the waterproof silicone rubber 12 from being cut off at the edge of the contact 8 and prevents a gap between the contact 8 and the waterproof silicone rubber 12 from being generated.

The connector 1 is provided with the waterproof silicone rubber 12 that is attached on the surface of the protector 6 on the +Z direction side with an adhesive. The waterproof silicone rubber 12 may be attached to the protector 6 by insert molding. The waterproof silicone rubber 12 functions as a first waterproof elastic member that prevents the liquid from intruding from a space between the contact 8 and the first opening portion 6*a*. The waterproof silicone rubber 12 is provided with cylindrical portions 12*a* (24 cylindrical portions 12*a*) that cover the covering portions 10*a* of the resin members 10, and each of the cylindrical portions 12*a* is disposed between the contact 8 and the first opening portion 6*a*. That is, the cylindrical portion 12*a* is interposed between the covering portion 10*a* covering the contact 8 and the first opening portion 6*a*. In each of the cylindrical portions 12*a*, two first pushing portions 12*b* are provided which push the contact 8 covered by the covering portion 10*a* via the covering portion 10*a* in a direction orthogonal to the Z-axis direction.

Each of the first pushing portions 12*b* is a protruding portion formed around an inner wall surface of the cylindrical portion 12*a*, and protrudes from the inner wall surface of the cylindrical portion 12*a* toward the center portion of the cylindrical portion 12*a*, and pushes the outer circumferential wall of the covering portion 10*a*. Since the first pushing portion 12*b* pushes the outer circumferential wall of the covering portion 10*a* without a gap, the liquid is prevented from intruding into a space between the contact 8 and the first opening portion 6*a*. While the contact 8 is moving in the ±Z direction with respect to the first opening portion 6*a*, the liquid is prevented from intruding into a space between the contact 8 and the first opening portion 6*a* since the first pushing portions 12*b* continue to push the outer circumferential wall of the covering portion 10*a*. In this embodiment, the case where the two first pushing portions 12*b* are provided has been described as an example, but one or three or more first pushing portions may be provided.

The waterproof silicone rubber 12 functions as a third waterproof elastic member that prevents the liquid from intruding into a portion around the contact portion 8*a* when the contact portion 8*a* of the contact 8 is electrically connected to the connection terminal 18 of the external device 2. That is, in this embodiment, the first waterproof elastic member and the third waterproof elastic member are formed of one member (waterproof silicone rubber 12). The first waterproof elastic member and the third waterproof elastic member may be formed of different members (separate members).

The waterproof silicone rubber 12 is provided with an outer circumferential wall 12*c* extending in the +Z direction, the outer circumferential wall 12*c* covering the portion around the 24 contact portions 8*a*. When the connection terminal 18 of the external device 2 is pushed against the contact portion 8*a* of the contact 8, the top of the outer circumferential wall 12*c* is pushed against a surface 20 on which the connection terminal 18 of the external device 2 is exposed, and thus a portion around the 24 contact portions 8*a* is a closed area in which the surface 20 on which the connection terminal 18 of the external device 2 is exposed is an upper surface, the outer circumferential wall 12*c* is a side surface, and a surface 12*e* parallel with the XY plane of the waterproof silicone rubber 12 is a bottom surface, and prevents the liquid from intruding into the portion around the contact portion 8*a*. That is, the top of the outer circumferential wall 12*c* functions as a third pushing portion that pushes the surface 20 on which the connection terminal 18 of the external device 2 is exposed in the +Z direction.

The waterproof silicone rubber 12 is provided with 23 waterproof walls 12*d* extending in the +Z direction between the contact portion 8*a* and the contact portion 8*a* which are adjacent to each other. When the connection terminal 18 of the external device 2 is pushed against the contact portion 8*a* of the contact 8, the top of the outer circumferential wall 12*c* and the top of the waterproof wall 12*d* are pushed against the surface 20 on which the connection terminal 18 of the external device 2 is exposed, and thus a portion around each of the contact portions 8*a* located the most on the ±Y direction side is a closed area in which the surface 20 on which the connection terminal 18 of the external device 2 is exposed is an upper surface, the outer circumferential wall 12*c* is formed by three side surfaces, the waterproof wall 12*d* is formed by one side surface, and the surface 12*e* parallel with the XY plane of the waterproof silicone rubber 12 is a bottom surface, and prevents the liquid from intruding into the portion around each of the contact portions 8*a* located the most on the ±Y direction side. The portion around each of the contact portions 8*a* other than the contact portions 8*a* located the most on the ±Y direction side is a closed area in which the surface 20 on which the connection terminal 18 of the external device 2 is exposed is an upper surface, the two outer circumferential walls 12*c* are formed by two side surfaces opposed to each other, the two waterproof walls 12*d* are two side surfaces, and the surface 12*e* parallel with the XY plane of the waterproof silicone rubber 12 is a bottom surface, and prevents the liquid from intruding into the portion around each of the contact portions 8*a* other than the contact portions 8*a* located the most on the ±Y direction side.

Figure 9:
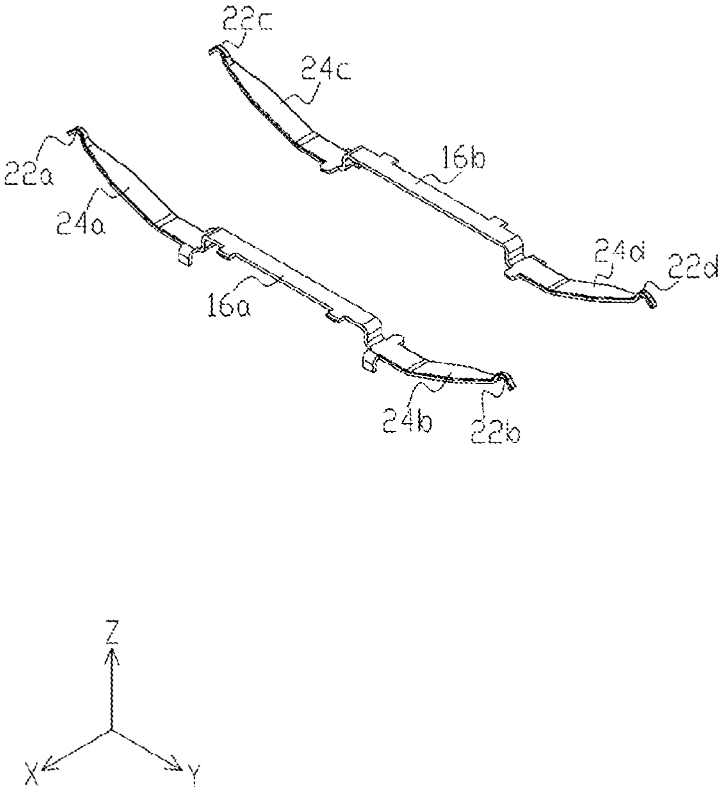
FIG. 9 is a view illustrating a return spring according to the embodiment.

As illustrated in FIG. 5, the connector 1 includes return springs 16*a* and 16*b* as an elastic member pushing the protector 6 in the +Z direction when the connector 1 is attached to the insulating member 4*b* of the base body 4, and the external device 2 is fitted to the connector 1. FIG. 9 is a view illustrating the return springs 16*a* and 16*b*. The return spring 16*a* is attached on the +X direction side, and the return spring 16*b* is attached on the −X direction side. When the connection terminals 18 of the external device 2 are pushed against the contact portions 8*a* of the contacts 8, tips 22*a* and 22*b* of the return spring 16*a* in contact with a bottom surface 6*c* of the protector 6 push up the bottom surface 6*c* (protector 6) in the +Z direction due to elasticity of elastic portions 24*a* and 24*b* of the return spring 16*a*. In the similar manner, when the connection terminals 18 of the external device 2 are pushed against the contact portion 8*a* of the contact 8, tips 22*c* and 22*d* of the return spring 16*b* in contact with a bottom surface 6*c* of the protector 6 push up the bottom surface 6*c* (protector 6) in the +Z direction due to elasticity of elastic portions 24*c* and 24*d* of the return spring 16*b*. Due to the action of the return springs 16*a* and 16*b*, the top of the outer circumferential wall 12*c* and the tops of the waterproof walls 12*d* are strongly pushed against the surface 20 on which the connection terminal 18 of the external device 2 is exposed, and the liquid can be surely prevented from intruding into the portion around each of the contact portions 8*a*.

In the connector 1 according to this embodiment, since the waterproof silicone rubber 12 as the first waterproof elastic member is provided, the liquid such as water can be surely prevented from intruding into a portion between the contact 8 and the first opening portion 6*a* (protector 6) from the outside of the connector 1. Since the first pushing portion 12*b* is provided, even when the contact 8 is moved with respect to the protector 6 in the Z direction, the liquid such water can be surely prevented from intruding into the portion between the contact 8 and the first opening portion 6*a* (protector 6) from the outside of the connector 1.

In the connector 1 according to this embodiment, since the waterproof silicone rubber 14 as a second waterproof elastic member is provided, the liquid such as water can be surely prevented from intruding into a portion between the protector 6 and the second opening portion 4*c* (base body 4) from the outside of the connector 1. Since the second pushing portion 14*a* is provided, even when the protector 6 is moved with respect to the base body 4 in the Z direction, the liquid such water can be surely prevented from intruding into the portion between the protector 6 and the second opening portion 4*c* (base body 4) from the outside of the connector 1.

In the connector 1 according to this embodiment, since the waterproof silicone rubber 12 as a third waterproof elastic member is provided, the liquid such as water can be surely prevented from intruding into a portion around the contact portion 8*a* when the external device 2 is fitted to the connector 1. In particular, since the outer circumferential wall 12*c* is provided, it is possible to prevent the liquid such as water from intruding into the portion around the contact portion 8*a* from the outside of the external device 2 and the connector 1. Since the waterproof wall 12*d* is further provided in addition to the outer circumferential wall 12*c*, for example, even in a case where the liquid intrudes into a portion around any of the contact portions 8*a* before the external device 2 is fitted to the connector 1, it is possible to prevent the liquid from intruding into a portion around another contact portion 8*a*. Since the return springs 16*a* and 16*b* are provided, the top of the outer circumferential wall 12*c* and the tops of the waterproof walls 12*d* are surely pushed against the surface 20 of the external device 2 without a gap, the liquid such as water can be surely prevented from intruding into the portion around the contact portion 8*a*.

Figure 10:
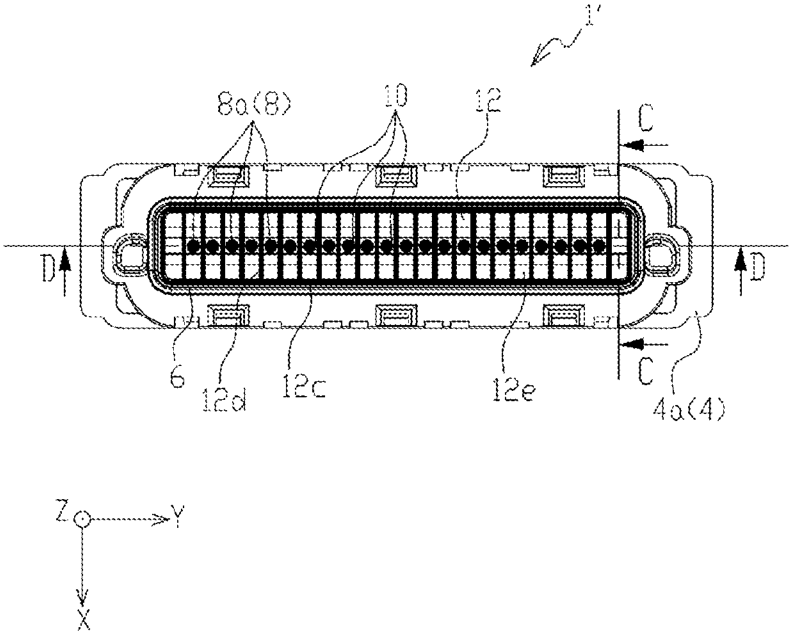
FIG. 10 is a plan view illustrating an appearance of a connector according to a modified example.
Figure 11:
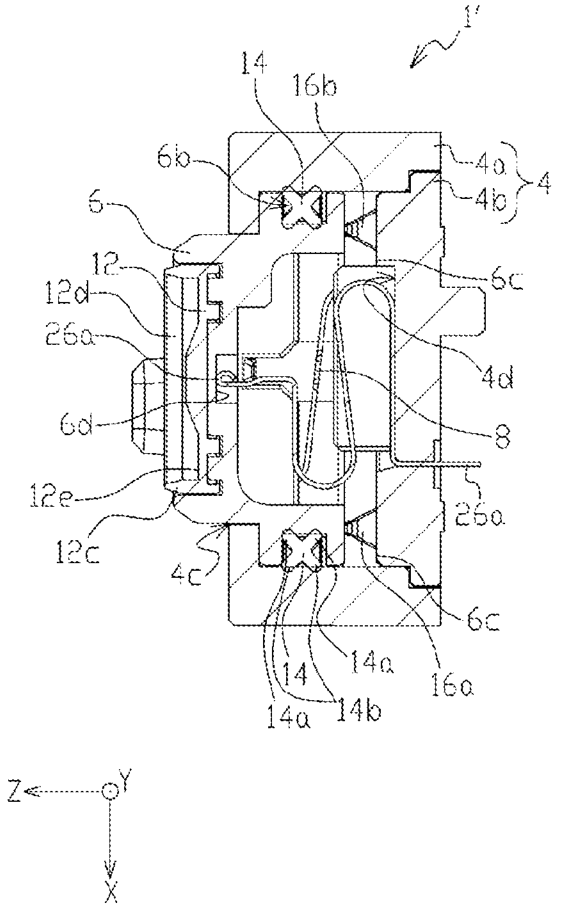
FIG. 11 is a cross-sectional view illustrating the connector according to the modified example.
Figure 12:
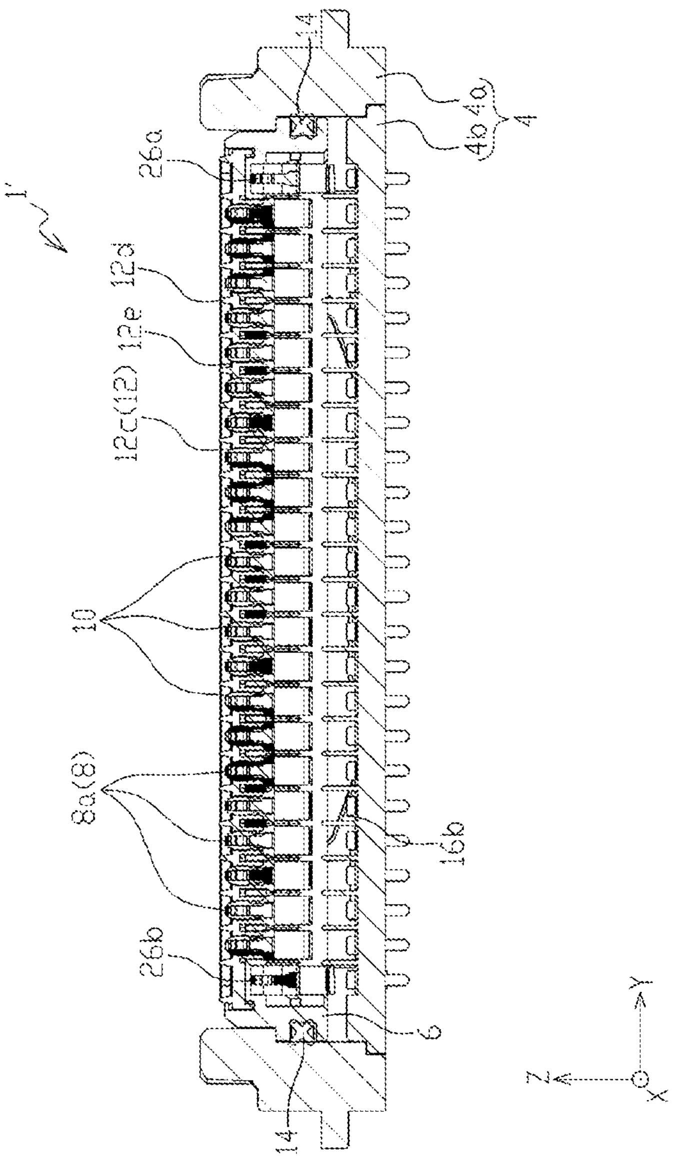
FIG. 12 is a cross-sectional view illustrating the connector according to the modified example.

In the embodiment described above, the case where the return springs 16*a* and 16*b* are provided to surely push the top of the outer circumferential wall 12*c* and the tops of the waterproof walls 12*d* against the surface 20 of the external device 2 without a gap has been described as an example, but for example, the return springs 26*a* and 26*b* may be further provided as illustrated in FIGS. 10 to 12. FIG. 10 is a plan view illustrating a modified example of the embodiment described above, FIG. 11 is a cross-sectional view taken along line C-C of FIG. 10, and FIG. 12 is a cross-sectional view taken along line D-D of FIG. 10.

As illustrated in FIGS. 10 to 12, a connector 1' according to the modified example includes the return springs 26*a* and 26*b* instead of the two contacts 8 arranged the most in the ±Y direction. The shapes of the return springs 26*a* and 26*b* are the same as the shapes of the 22 contacts 8, and the return spring 26*a*, the 22 contacts 8, and the return spring 26*b* are arranged in a row in the Y direction in this order. The return springs 26*a* and 26*b* are not covered by the resin member 10. On the +Z direction side of the return springs 26*a* and 26*b*, the first opening portion 6*a* of the protector 6 and the cylindrical portion 12*a* of the waterproof silicone rubber 12 are not provided. Therefore, although the return springs 26*a* and 26*b* have the same shapes as that of the contact 8, the return springs 26*a* and 26*b* do not function as contacts electrically connected to the connection terminal 18 of the external device 2.

When the connection terminal 18 of the external device 2 is pushed against the contact portion 8*a* of the contact 8, the return springs 16*a* and 16*b* push up the protector 6 in the +Z direction, and the return springs 26*a* and 26*b* in contact with a back surface 6*d* of the protector 6 push up the back surface 6*d* (protector 6) in the +Z direction. Due to the action of the return springs 16*a*, 16*b*, 26*a*, and 26*b*, the top of the outer circumferential wall 12*c* and the tops of the waterproof walls 12*d* are strongly pushed against the surface 20 on which the connection terminal 18 of the external device 2 is exposed, and the liquid can be surely prevented from intruding into the portion around each of the contact portions 8*a*. In the modified examples illustrated in FIGS. 10 to 12, the return springs 16*a*, 16*b*, 26*a*, and 26*b* are provided, but only the return springs 26*a* and 26*b* may be provided without including the return springs 16*a* and 16*b*.

Further, in the embodiment described above, the case where a silicone rubber as the waterproof elastic member is provided as an example has been described, but even the waterproof elastic member other than the silicone rubber can also be applied to the present invention. In the embodiment described above, the resin member is provided, but in a case where the contact without an edge is used, the waterproof elastic member is not likely to be scratched. Therefore, the resin member may not be provided.

The above embodiments have been described for illustrative purpose only and are not to be construed as limiting the present invention. Accordingly, each element disclosed in the above embodiments intends to include all design changes and equivalents within a technical range of the present invention.

The invention claimed is:

1. A connector comprising:

a contact that includes a contact portion electrically connected to a connection terminal by pushing the connection terminal of an external device in a predetermined direction;

a protector that protects the contact portion by covering the contact and includes a first opening portion making the contact portion protrude in a direction opposite to the predetermined direction; and a base body that accommodates the contact and the protector, and includes a second opening portion making the protector protrude in the direction opposite to the predetermined direction, wherein the contact portion is movable in the predetermined direction and in the direction opposite to the predetermined direction with respect to the first opening portion, the protector is movable in the predetermined direction and in the direction opposite to the predetermined direction with respect to the second opening portion, and the connector includes a first waterproof elastic member that is provided between the contact and the first opening portion, and prevents liquid from intruding from a space between the contact and the first opening portion, and a second waterproof elastic member that is provided between the protector and the second opening portion, and prevents liquid from intruding from a space between the protector and the second opening portion wherein the second waterproof elastic member includes a second pushing portion that pushes a portion around the protector located in a vicinity of the second opening portion in the direction intersecting the predetermined direction.

2. The connector according to claim 1, wherein at least one of the first waterproof elastic member or the second waterproof elastic member is formed of silicone rubber.

3. The connector according to claim 1, wherein a cross-sectional shape of the second waterproof elastic member is an X shape.

4. The connector according to claim 3, further comprising a third waterproof elastic member that includes a wall covering a portion around the contact portion and extending in the direction opposite to the predetermined direction, and prevents the liquid from intruding into the portion around the contact portion when the contact portion of the contact is electrically connected to the connection terminal of the external device.

5. The connector according to claim 1, wherein the first waterproof elastic member includes a first pushing portion that pushes a portion around the contact in a vicinity of the contact portion in a direction intersecting the predetermined direction.

6. The connector according to claim 5, further comprising a third waterproof elastic member that includes a wall covering a portion around the contact portion and extending in the direction opposite to the predetermined direction, and prevents the liquid from intruding into the portion around the contact portion when the contact portion of the contact is electrically connected to the connection terminal of the external device.

7. The connector according to claim 1, further comprising a resin member that covers the contact in a vicinity of the contact portion, wherein the first waterproof elastic member is interposed between the resin member and the first opening portion.

8. The connector according to claim 7, wherein the first waterproof elastic member includes a first pushing portion that pushes a portion around the contact in the vicinity of the contact portion in a direction intersecting the predetermined direction.

9. The connector according to claim 7, further comprising a third waterproof elastic member that includes a wall covering a portion around the contact portion and extending in the direction opposite to the predetermined direction, and prevents the liquid from intruding into the portion around the contact portion when the contact portion of the contact is electrically connected to the connection terminal of the external device.

10. The connector according to claim 1, further comprising a third waterproof elastic member that includes a wall covering a portion around the contact portion and extending in the direction opposite to the predetermined direction, and prevents the liquid from intruding into the portion around the contact portion when the contact portion of the contact is electrically connected to the connection terminal of the external device.

11. The connector according to claim 10, wherein the first waterproof elastic member and the third waterproof elastic member are formed of one member.

12. The connector according to claim 10, further comprising a plurality of the contacts, wherein the third waterproof elastic member includes a waterproof wall extending in the direction opposite to the predetermined direction between the contact portion and the contact portion.

13. The connector according to claim 10, wherein the third waterproof elastic member includes a third pushing portion that pushes a surface, on which the connection terminal of the external device is exposed, in the direction opposite to the predetermined direction.

14. The connector according to claim 13, wherein the first waterproof elastic member and the third waterproof elastic member are formed of one member.

15. The connector according to claim 13, further comprising an elastic member that pushes the protector in the direction opposite to the predetermined direction when the external device is fitted to the connector.

16. The connector according to claim 15, wherein the first waterproof elastic member and the third waterproof elastic member are formed of one member.

* * * * *